Figure 1:
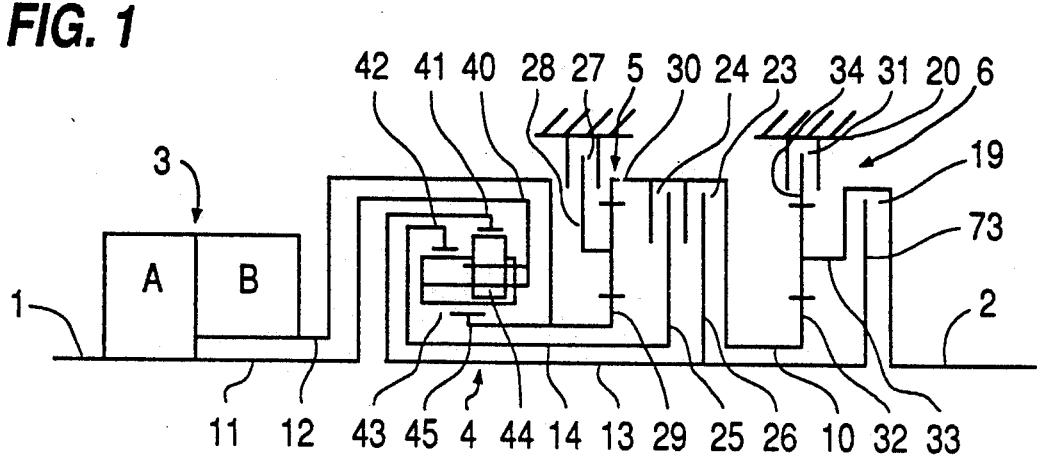

United States Patent [19]
Meyerle

[11] Patent Number: 5,267,911
[45] Date of Patent: Dec. 7, 1993

[54] HYDROMECHANICALLY INFINITELY VARIABLE TRANSMISSION, WITH POWER SPLITTING, PARTICULARLY FOR MOTOR VEHICLES

[76] Inventor: Michael Meyerle, Kiefernweg 9, Meckenbeuren-Lochbrucke, Fed. Rep. of Germany

[21] Appl. No.: 950,767

[22] Filed: Sep. 24, 1992

Related U.S. Application Data

[63] Continuation of Ser. No. 806,797, Dec. 12, 1991, abandoned, which is a continuation of Ser. No. 536,647, Jul. 6, 1990, filed as PTC/DE89/00586, Sep. 9, 1989, abandoned.

[30] Foreign Application Priority Data

Sep. 10, 1988 [DE] Fed. Rep. of Germany ....... 3830846
Sep. 2, 1989 [DE] Fed. Rep. of Germany ....... 3929209

[51] Int. Cl.⁵ .................................................. F16H 39/00
[52] U.S. Cl. .................................................. 475/81
[58] Field of Search .................. 475/6, 10, 72, 79, 81, 475/275, 286, 330

[56] References Cited

U.S. PATENT DOCUMENTS

| | | | |
|---|---|---|---|
| 4,164,156 | 8/1979 | Reed et al. | 74/687 |
| 4,184,385 | 1/1980 | Maeda | 475/81 |
| 4,232,568 | 11/1980 | Maeda | 475/81 |
| 4,291,592 | 9/1981 | Meyerle et al. | 475/81 |
| 4,304,151 | 12/1981 | Meyerle et al. | 475/81 X |
| 4,341,131 | 7/1982 | Pellman | 475/81 |
| 4,683,776 | 8/1987 | Klemen | 475/286 |
| 4,754,664 | 7/1988 | Dick | 475/81 |

FOREIGN PATENT DOCUMENTS

| | | |
|---|---|---|
| 3342047 | 6/1985 | Fed. Rep. of Germany . |
| 3609907 | 9/1985 | Fed. Rep. of Germany . |
| 2412760 | 7/1979 | France . |
| 2412761 | 7/1979 | France . |
| 52-074766 | 6/1977 | Japan . |

*Primary Examiner*—Dirk Wright
*Attorney, Agent, or Firm*—Staas & Halsey

[57] ABSTRACT

A hydromechanically infinitely variable transmission with power splitting for motor vehicles with at least five gearshift ranges. The transmission can be infinitely varied by means of a hydrostatic transmission. A hydrostat transmission, a multi-shaft summation planetary transmission and at least two downstream planetary transmission units constitute basic components which can be mutually coupled in transmission combinations of various configurations. The power summarized in the summarization planetary transmission is transmitted alternately through an intermediate shaft or coupling shaft and clutches to a planetary transmission unit. In at least one gearshift range, a shaft of the summarization planetary transmission is connected directly via a clutch to the output shaft. Depending on the embodiment, one to three reverse gear ranges can be incorporated in the transmission.

19 Claims, 7 Drawing Sheets

HYDROMECHANICALLY INFINITELY VARIABLE TRANSMISSION, WITH POWER SPLITTING, PARTICULARLY FOR MOTOR VEHICLES

This application in a continuation of application Ser. No. 07/806,797, filed on Dec. 12, 1991, now abandoned, which is a continuation of Ser. No. 07/536,647, filed on Jul. 6, 1990, filed as PTC/DE89/00586, Sep. 9, 1989, now abandoned.

The invention refers to hydromechanical infinitely variable transmissions, with power splitting, particularly for motor vehicles. The invention has particular applicability to transmissions having at least four forward operating ranges, a first hydrostat unit of adjustable volume, a second hydrostat unit, preferably of constant volume, and a summation planetary transmission with at least four shafts for summing the hydraulic and mechanical power. In the transmission of the invention, a first shaft of the summation planetary transmission is constantly connected with the drive shaft and with the first hydrostat unit, a second shaft of the summation planetary transmission is constantly connected with the second hydrostat unit, and the other shafts of the summation planetary transmission are output shafts which can be alternately connected directly or indirectly to the power output shaft.

Hydromechanically infinitely variable transmission, with power splitting with four or more forward operating ranges are known from German patent applications DE 37 09 191 and DE 33 42 047. These transmissions are not completely infinitely variable, however, i.e. in the starting range until a certain minimum speed is attained there is a step up gap that must be bridged by a friction clutch, and they do not have the alternative solution of being able to be developed into a completely infinitely variable transmission. Another hydromechanically infinitely variable transmission with power splitting is known from U.S. Pat. No. 4,164,155 which indeed has four forward operating ranges but a very limited utilization capability for the hydrostatic elements and insufficient adaptability of the range sizes to specific vehicle requirements. Hydrostat adjustment can only be utilized up to 67% in the negative range of adjustment. Furthermore, the fourth operating range is too short to fulfill the actual task of a fourth operating range, namely to reduce the size of the hydrostat units to a sufficient degree and to use the fourth operating range as overdrive range as extensively as possible.

The invention is based on the task of providing a hydromechanically infinitely variable transmission with power splitting according to the introductory description of claims 1 through 5, that can be made to be completely infinitely variable compared to the known systems and that does not require a separate starting clutch and/or can be alternatively modified, depending on application, into a transmission that is not completely infinitely variable. The transmission should make do with very small hydrostat units. In addition, a thorough adaptability to various conditions specific to vehicles should be possible, with different forward and reverse conditions able to be fulfilled in an economical and space-saving manner.

The task is solved by the characteristics listed in the main claims 1 through 5. Further advantageous developments of the invention can be gathered from the sub-claims and the subsequent description.

The invention is explained in forms of construction using diagrams.

Figure 2:
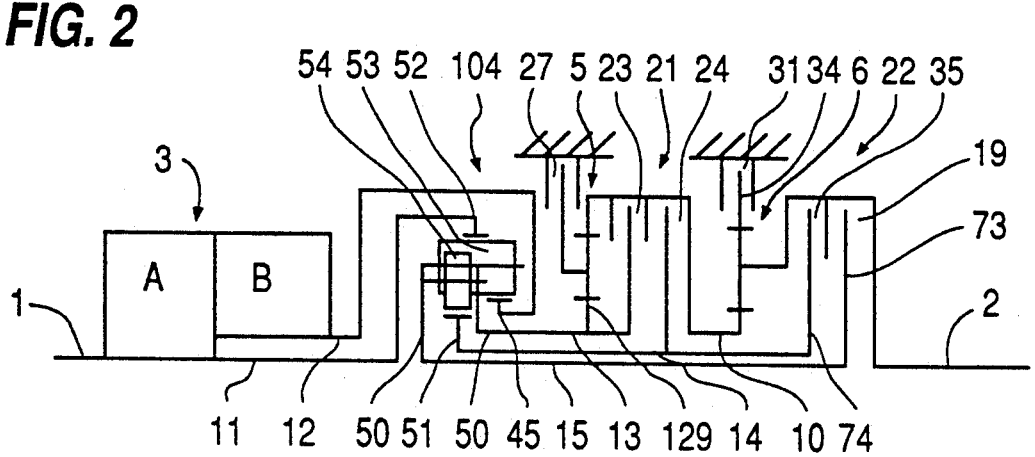
Figure 3:
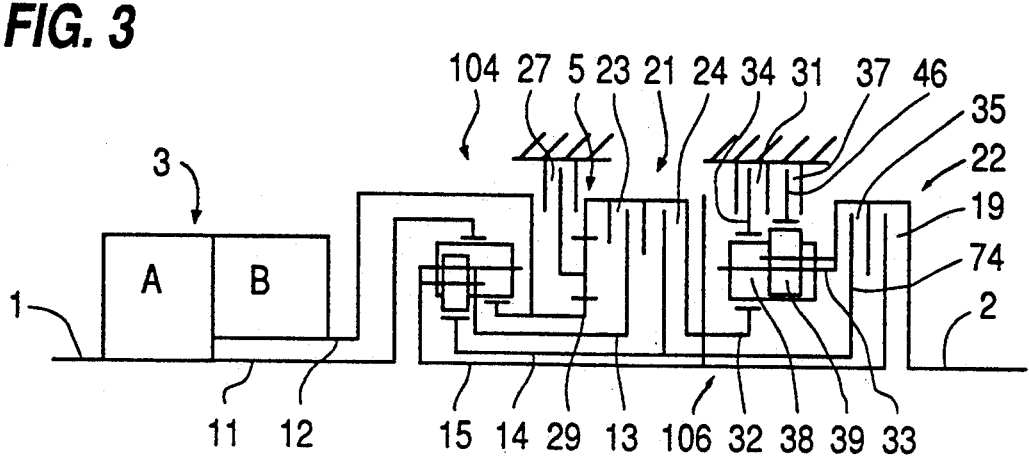
Figure 3A:
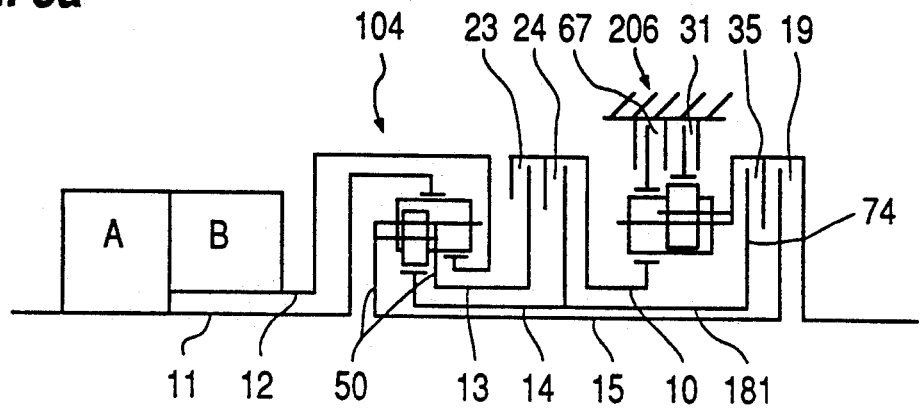
Figure 4:
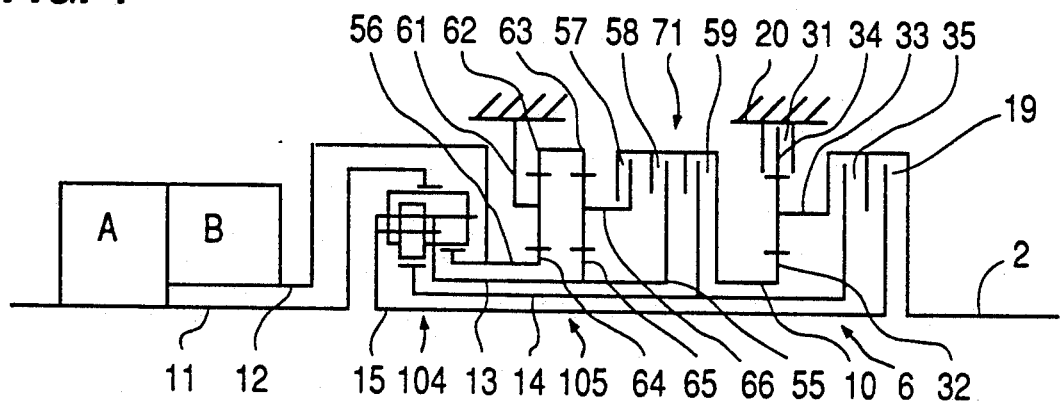
Figure 5:
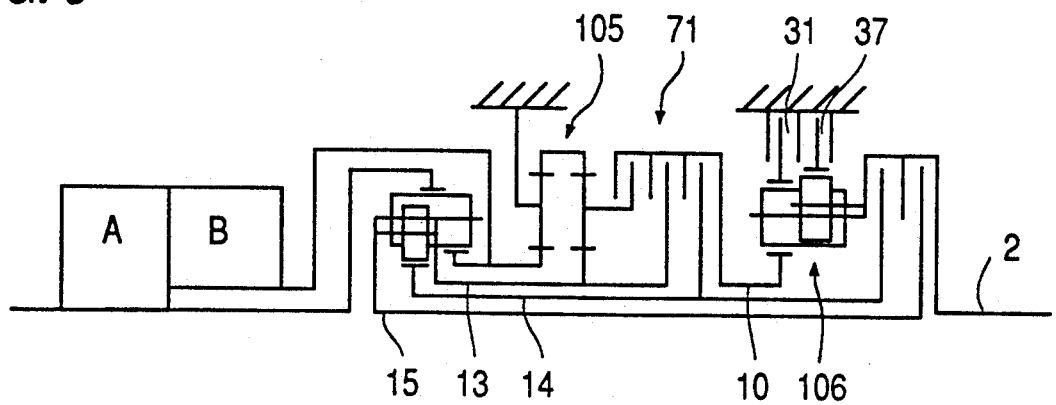
Figure 6:
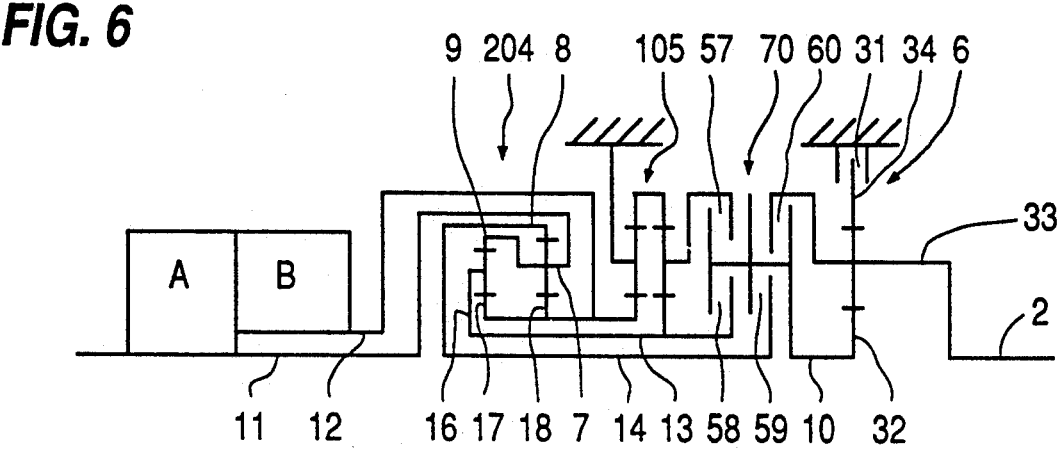
Figure 7:
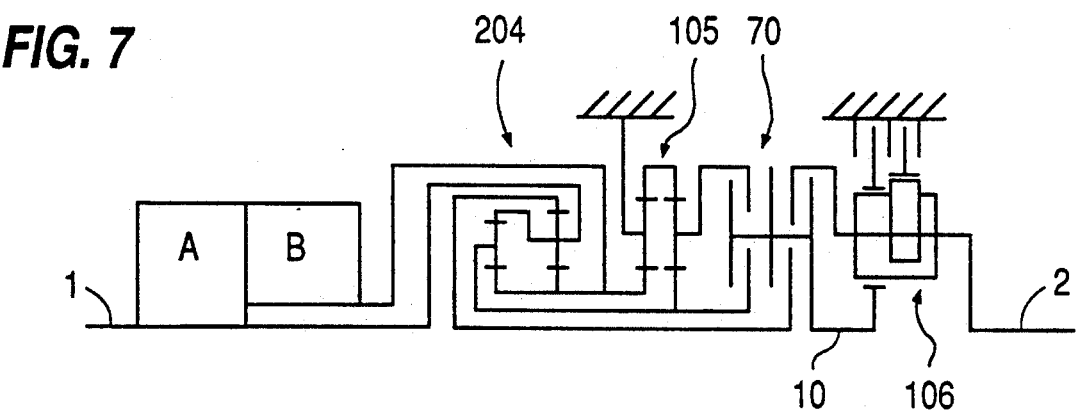
Figure 8:
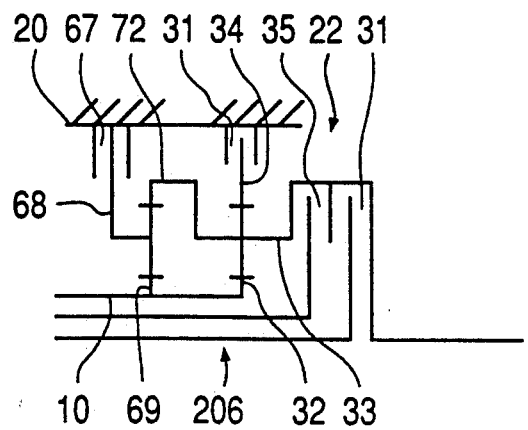
Figure 9:
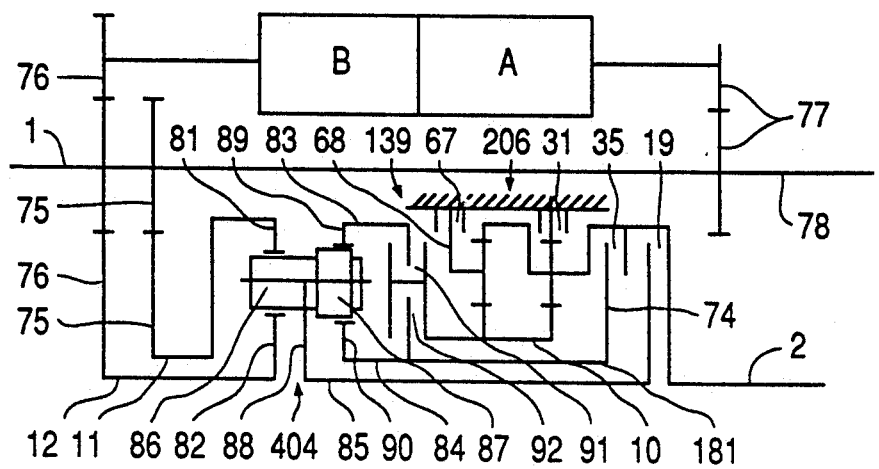
Figure 10:
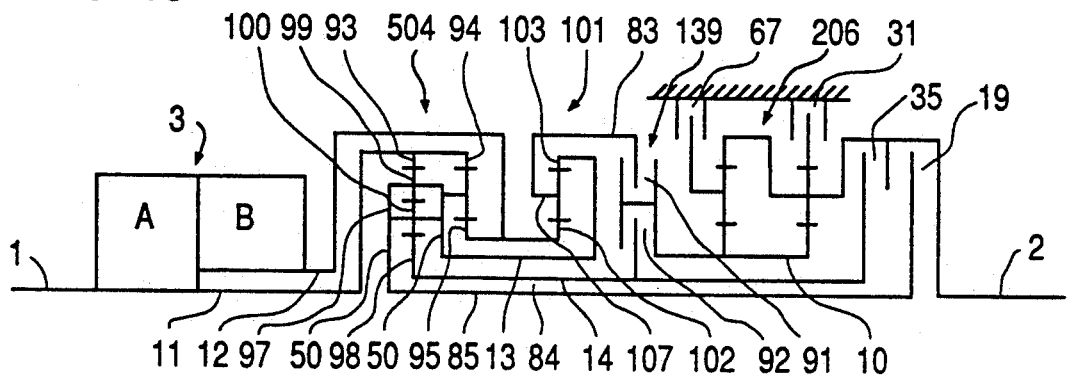
Figure 11:
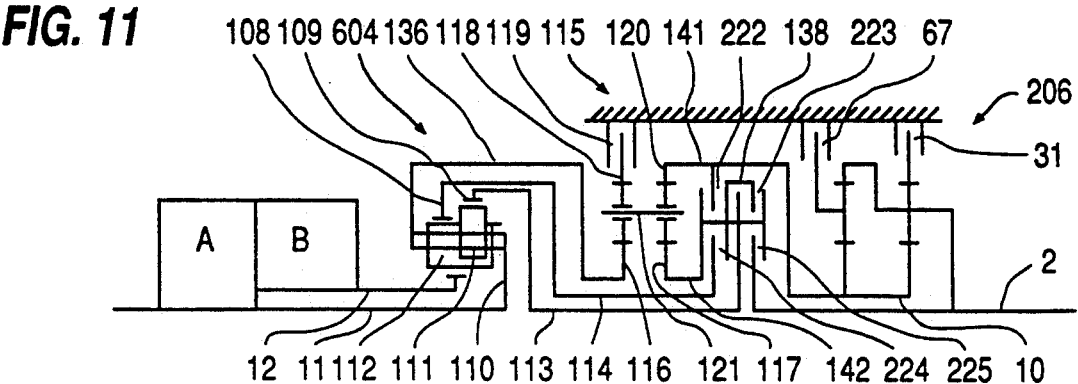
Figure 12:
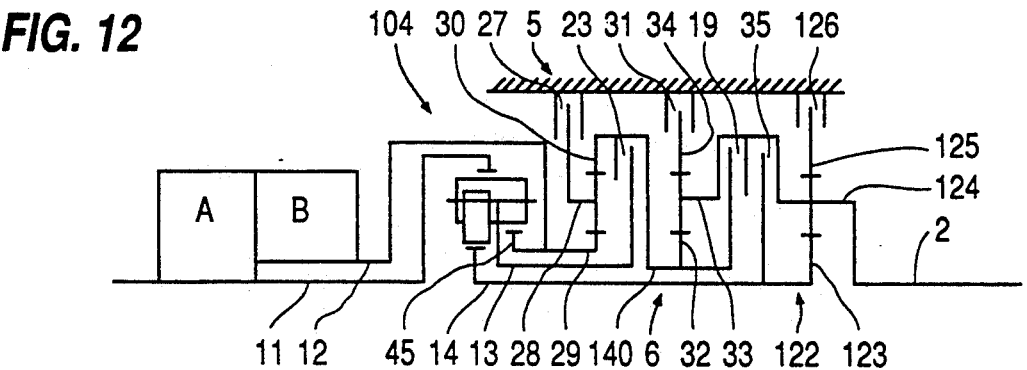
Figure 13:
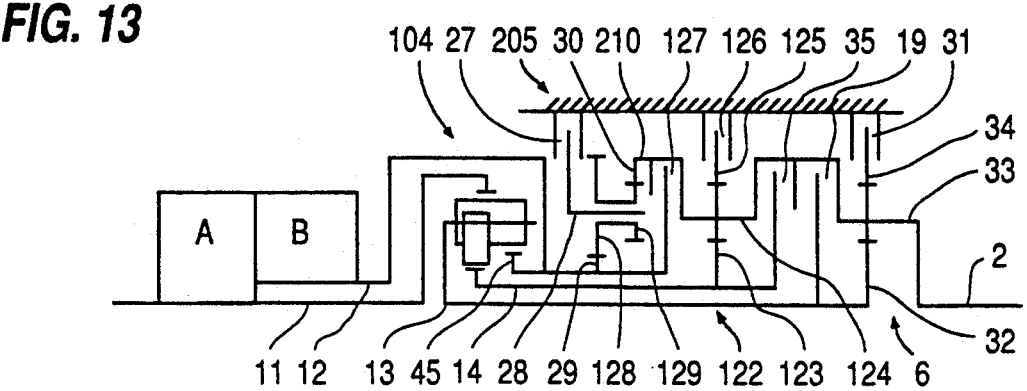
Figure 14:
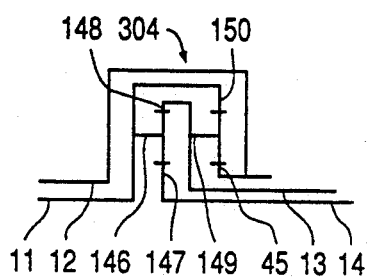
Figure 15:
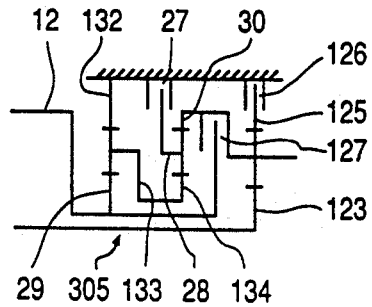
Figure 16:
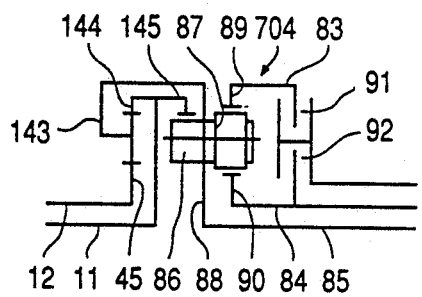
Figure 16A:
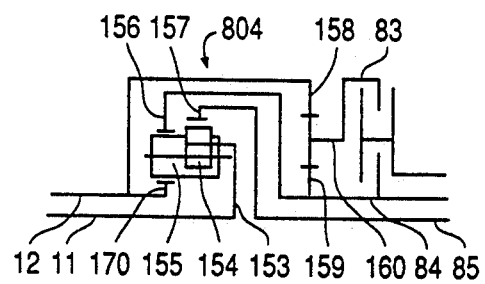
Figure 16B:
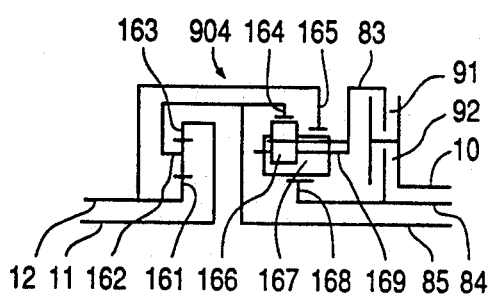
Figure 17:
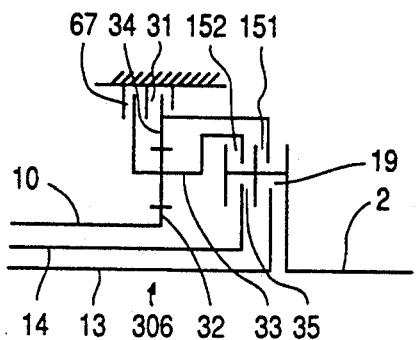
Figure 18:
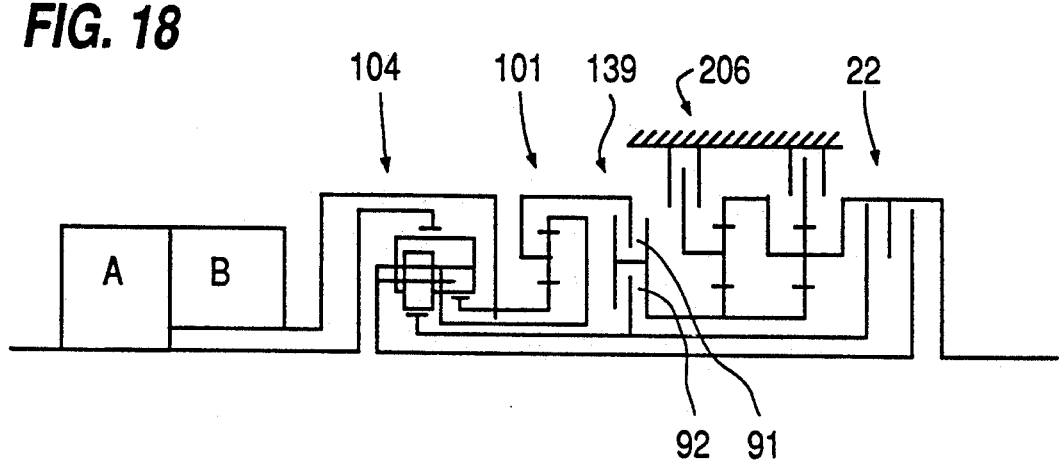
Figure 19:
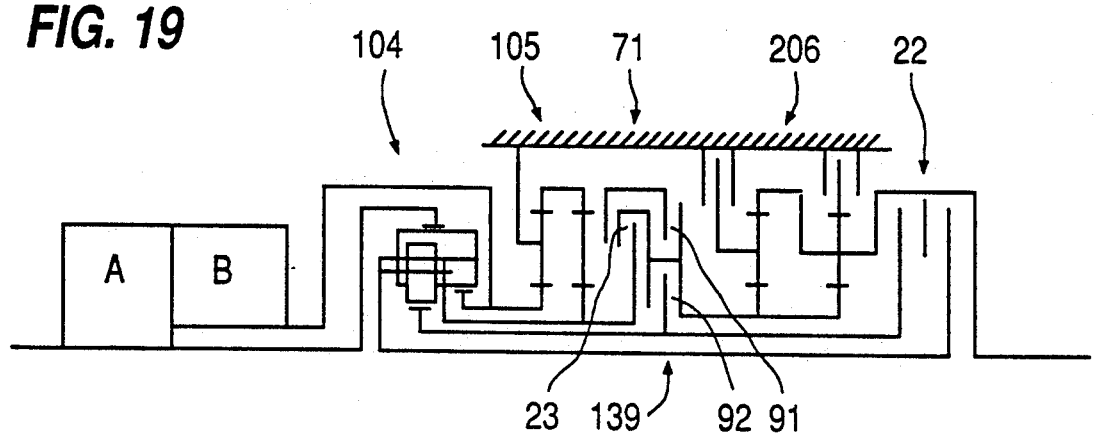
Figure 20:
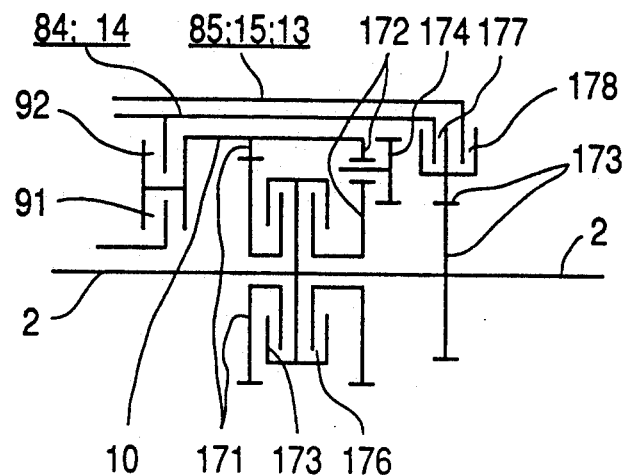

FIG. 1 a basic form of construction with four forward operating ranges and one reverse range;

FIG. 2 a further form of construction with four forward operating ranges one reverse range;

FIG. 3 a form of construction with five forward operating ranges and three reverse operating ranges;

FIG. 3a a form of construction with four hydromechanical forward operating ranges and two hydrostatic reverse ranges;

FIG. 4 a form of construction with five hydromechanical forward operating ranges;

FIG. 5 a form of construction with five hydromechanical forward operating ranges and three hydromechanical reverse ranges;

FIG. 6 a form of construction of a transmission with four hydromechanical forward operating ranges;

FIG. 7 a form of construction of a transmission with four forward operating ranges and three hydromechanical reverse ranges;

FIG. 8 a form of construction of the third planetary transmission 206;

FIG. 9 a form of construction with four forward operating and 9a ranges and two reverse operating ranges consisting of a five-shaft summarizing planetary transmission;

FIG. 10 a further form of construction with four forward operating ranges and one reverse range;

FIG. 11 a transmission construction with two summarizing planetary transmission units;

FIG. 12 a transmission construction with five forward operating ranges and two separately switchable, purely hydrostatic reverse operating ranges;

FIG. 13 a transmission construction with five forward operating ranges;

FIG. 14 a planetary transmission consisting of two planetary transmission steps;

FIG. 15 a two-step planetary transmission unit 305;

FIGS. 16, 16a, 16b three forms of construction of the five-shaft summarizing planetary transmission;

FIG. 17 a third planetary transmission unit consisting of a planetary transmission step and several clutches for shifting from forward and reverse operating range as alternatives to the planetary transmission units 106 and 206;

FIG. 18 a transmission construction with four forward and two reverse ranges;

FIG. 19 a transmission construction with five forward and three reverse operating ranges;

FIG. 20 illustrates an alternative spur gear transmission which may be used as a replacement for downstream planetary transmission stages 106, 206, 306.

With regard to good overall economy for such a product, it is important to provide a transmission system with which several different vehicle requirements can be covered. The basic components—hydrostat set, summarizing planetary transmission unit, clutch set and further component sets—should be able to be formed as basic components that are suited to a wide range of application in various transmission combinations. It is furthermore important to be able to integrate two to three reverse ranges, e.g. for application in the work machine range in the system to keep from needing an additional turning gear.

The invention is characterized in that at least four operating ranges are switchable or that with regard to certain vehicle requirements, a transmission with three forward operating ranges and preferably two reverse ranges can be constructed in a simple manner. According to the invention, this is achieved by having one or more transmission units attached to a summarizing planetary transmission with at least four shafts, with the first shaft and the second shaft of the summarizing planetary transmission being primary shafts and the first shaft connected with the first hydrostat unit A of adjustable volume, the second shaft connected with the second hydrostat unit B preferably of constant volume, and the third, fourth and, where applicable, fifth shaft of the summarizing planetary transmission alternately able to be connected with one or more of the attached planetary transmission units within the lower shifting range by way of an intermediate shaft or clutch shaft, and by one or more output shafts (carrying the summarized power) of the summarizing planetary transmission able to be directly connected with the power takeoff shaft in the higher shifting ranges. In each case, range switching takes place in synchronous running or in the synchronous running range of the clutch elements to be switched. In some of the forms of construction the first operating range is translated purely hydrostatically with the summarizing planetary transmission remaining without load and power flowing through one or more attached planetary transmission units. The speed level of all transmission members is relatively low. A step for adaptation of speed to the transmission output shaft is not required, so the usual axle ratios of the downstream driving axle can be used. The individual transmission constructions make it possible to have a very high overdrive range with regard to optimal utilization of the best consumption values of the driving motor.

The form of construction according to FIG. 1 has four forward operating ranges and one reverse range, with the first forward operating range and the reverse range working purely hydrostatically and the other operating ranges working hydromechanically. Within the three forward operating ranges and the reverse range, the internal gear 34 of a third planetary transmission 6; 106; 206; 306 is connected with the housing by the closing of a clutch or brake 31. In the first forward operating range and reverse range, power flows purely hydrostatically with the first range clutch 27 closed and planet carrier 28 thus fixed, via the members—sun gear 29 and internal gear 30 of the second planetary transmission 5 to the clutch shaft 10 and sun gear 32 via the planet carrier 33 of the third planetary transmission 6 to the power takeoff shaft 2. In the second forward operating range the summarized hydraulic and mechanical power is relayed by the fourth shaft 14 of the summarizing planetary transmission 4, with clutch 24 closed, via the third planetary transmission 6 to the power takeoff shaft 2. In the fourth switching range the hydromechanical power transmission takes place via the third shaft 13 of the summarizing planetary transmission, which is connected directly with the power takeoff shaft 2 via the closed clutch 19.

As in all forms of construction, the hydraulic power and the mechanical power are summarized in the summarizing planetary transmission 4; 104; 204; 304; 404; 504; 101; 604; 704 and conveyed in the corresponding operating ranges to the power takeoff via a shaft 13, 14; 13, 14, 15; 66, 55, 14, 15; 83, 84, 85; 141, 113, 114 respectively. Through the third planetary transmission 6; 106; 206; 306 the possibility of on or two additional switching ranges is created in spite of low speed of all transmission members.

The form of construction according to FIG. 2 has four forward operating ranges and one reverse operating range, which all work with power splitting. There is a ratio spreading contained in the first operating range and in the reverse range, with the first range of ratios in the respective starting mode bridged from driving speed "zero" to a certain ratio point "X" by a starting installation. This starting installation can be a clutch that is already present in the transmission and formed as friction clutch, or a bypass valve switched between the two hydrostat units A and B, as is already known by the German patent application DE 36 09 907. In this form of construction according to FIG. 2 it is useful to construct the clutch or brake 31 for braking the transmission member 34 of the third planetary transmission 6 as starting installation with corresponding friction members. All range clutches 27, 23, 24, 19 and 35 are switchable in the synchronous mode and can thus be constructed as switchable clutches with determined shape and load, as described in the German Patent Application P 37 00 813.

With the exception of the transmission construction according to FIG. 2, all transmission constructions shown are completely infinitely variable up to driving speed "zero", i.e. additional starting installations can be dispensed with.

The transmission construction according to FIG. 3 has five forward operating ranges and three reverse operating ranges as well as an additional special reverse range for special uses. The transmission is, with the exception of the corresponding fifth operating range and the adapted summarizing planetary transmission 104, identical to the construction according to FIG. 1. In the fifth forward operating range, the summarized hydraulic and mechanical power is relayed by the third shaft 50 of the summarizing planetary transmission 104 through a corresponding internal shaft 15, with clutch 19 closed, to the power takeoff shaft 2. The third planetary transmission 106 is in four-shaft form in this case, whereby in order to switch the reverse operation, an internal gear 46 is connected to the housing by closing of clutch 37 and in this way, the turning direction of the power takeoff shaft 2 is reversed. In the process, the power transmission within a first, second and third operating range for the alternately closed clutches 27, 23 and 24, in each case, is provided in reverse.

In FIG. 3 the four-shaft, third planetary transmission 106 is constructed with two interlocking planet gears 38 and 39 that rest on the planet carrier 33 connected to the power takeoff shaft 2, with internal gear 34 engaging a first set of planet gears 38 and internal gear 46 engaging a second set of planet gears 39. In place of this third planetary transmission 106, a form of construction 206 according to FIG. 8 is also advantageous, wherein the sun gears 32 and 69 of two planetary transmission stages are connected with the common clutch shaft 10 and the planet carrier 68 of the first stage can be connected with the housing via a clutch 67 in order to switch the reverse operating ranges, and the internal gear 72 of the first stage is connected with the planet carrier 33 of the second stage as well as with the power takeoff shaft 3, and the internal gear 34 of the second stage can be connected with the housing via a clutch or brake 31.

A transmission construction according to FIG. 3a is constructed similarly to the construction according to FIG. 3, but with the difference that the so-called second planetary transmission that is used to transmit the purely hydrostatic power within the first forward operating range and the first reverse operating range in the construction according to FIG. 3 is dispensed with. The first forward and reverse ranges are bridged via a special starting installation for this transmission, as in the construction according to FIG. 2, with this bridged range designated as range spreading or ratio spreading "X", as already described under FIG. 2. The transmission has four hydromechanical forward operating ranges and two hydromechanical reverse operating ranges, with the transmission construction and the operation or operational processes identical to the second and third forward and reverse range of the construction according to FIG. 3. As starting installation in this instance, the clutches 31 and 37 or 67 of the four-shaft planetary transmission 106; 206 or of the three-shaft planetary transmission 306 are used for practical purposes, and they are formed as friction clutches in this case. The four-shaft downstream planetary transmission 106; 206 can also be replaced by the aforementioned three-shaft planetary transmission 306, FIG. 17, in which the power takeoff shaft 2 is connected with the planet carrier shaft 33 in forward operation and with the internal gear 34 in reverse operation.

This transmission construction is of relatively simple construction and can make do with particularly small hydrostat units due to the four forward operating ranges and the range spreading.

The transmission constructions according to FIGS. 4, 5, 6 and 7 are completely infinitely variable, with power being transmitted hydromechanically in all operating ranges. The summarizing planetary transmission consists of two planetary transmission units, with the first planetary transmission unit 104; 204; 304; 4 in four-shaft form and continuously connected with the second planetary transmission unit 105 via two shafts 56 and 13. The second planetary transmission unit 105 consists of two planetary transmission stages, with the first planetary transmission stage with its sun gear 65 connected with the second shaft 56 or 12 of the summarizing planetary transmission, the planet carrier 61 of which is firmly in connection with the housing, the internal gear 62 is coupled with the internal gear 63 of the second planetary transmission stage and the sun gear 65 of the second planetary transmission stage is in connection with the third shaft 13 of the summarizing planetary transmission, and the planet carrier 66 of the second planetary transmission stage can be connected via a clutch 57 in the first switching range. As an alternative, the planet carrier shaft 66 of the second planetary transmission 105 can be continuously connected with the clutch shaft, in which case the other planet carrier shaft 61 of the first planetary transmission stage can be coupled with the housing 20 via a clutch. The first shaft of the summarizing planetary transmission is connected with the first hydrostat unit A of adjustable volume and the driving shaft 1, and the second shaft 12 is connected with the second hydrostat unit B; the third shaft 13 ca additionally be connected with common clutch shaft 10 via an intermediate shaft 55 and a clutch 58, and can also be connected directly with the power takeoff shaft 2 via a further shaft 15 and a clutch 19. The fourth shaft 14 of the summarizing planetary transmission can be connected with the common clutch shaft via a clutch 59 and with the power takeoff shaft 2 via a further clutch shaft through clutch 35. The third planetary transmission 6; 106; 206; 306 is downstream from clutch set 71 with the common clutch shaft 10, and its first shaft, sun gear 32 is connected with the common clutch shaft 10 and a second shaft, as planet carrier 33, is continuously in connection with the power takeoff shaft 2, and the third shaft, as internal gear 34, can be connected with the housing 20 via a clutch 31.

The constructions according to FIGS. 4 through 7 have five hydromechanical forward operating ranges. When applying a third planetary transmission 106; 206; 306 with installation for reverse drive, by closing the clutch or brake 37; 67 and simultaneously connecting an internal gear 46; 34 with the housing, a reverse operation through three switching ranges is possible while within the alternately switched clutches 57, 58 and 59, the turning direction of the power takeoff shaft 2 in relation to the clutch shaft 1 is reversed. The transmission construction according to FIG. 6 is largely identical to the construction according to FIG. 4 but with the difference that in the fourth forward operating range, the power takeoff shaft 2 is directly coupled with the common clutch shaft 10 and at the same time, by closing clutch 58, the third shaft 13, Which carries the summarized hydromechanical power in this operating mode, is connected with the power takeoff shaft 2. All rotating clutches for all four switching ranges are assembled in one clutch set 70 in this instance.

The construction according to FIG. 7 corresponds to the construction according to FIG. 6 but with the difference that the third planetary transmission 106 is in four-shaft form, causing the turning direction on the power takeoff shaft 2, in switched reverse operation, to be reversed within the first three switching ranges, as already described in the FIG. 5 and 3 construction.

The summarizing planetary transmission 4 according to FIG. 1 has interlocking first planet gears 43 and second planet gears 44, which rest on a common planet carrier 40 and are connected with the first shaft 11. A sun gear 45 is in drive connection with the second shaft 12 and a first set of planet gears 43. An internal gear 41 engages two planet gears 44 and is connected with the third shaft 13, and a second internal gear 42 meshes with a first set of planet gears 43 and is in drive connection with the fourth shaft 14 of the summarizing planetary transmission.

The summarizing planetary transmission 104 has an internal gear, two sun gears as well as interlocking first and second planet gears that rest on a common planet carrier. The internal gear 52 is connected with the first shaft 11 and the sun gear 45 with the second shaft 12, with the shafts both engaging in a first set of planet gears 53, and the other sun gear 51 is in connection with the fourth shaft 14 and meshes with a second set of planet gears 54. The planet carrier 50, on which all planet gears 53 and 54 rest, forms the third shaft of the summarizing planetary transmission and is alternatively connected with two output shafts 13 and 15.

The summarizing planetary transmission 204 according to FIGS. 6 and 7 consists of two planetary stages, with the first shaft 11 in connection with the internal gear 9 of the first stage and the planet carrier 7 of the second stage, the second shaft 12 in connection with the sun gears 17 and 18, the third shaft 13 forms the planet carrier 16 of the first planetary transmission stage and the internal gear 8 of the second stage the fourth shaft 14.

The transmission construction according to FIG. 9 is characterized in that the summarizing planetary transmission 404 is in five-shaft form, with the first shaft 11 as first primary shaft connected with the first hydrostat unit A and the driving shaft 1. The second shaft 12 as second primary shaft is connected with the second hydrostat unit B. The summarizing planetary transmission 404 has three output shafts, with the first output shaft 83 forming the third shaft of the summarizing planetary transmission, the second output shaft 84 forming the fourth shaft and the third output shaft 85 forming the fifth shaft of the summarizing planetary transmission. A further planetary transmission 206 is attached to the summarizing planetary transmission, and it can be connected with two output shafts 83 and the fourth output shaft 84 alternately via an intermediate shaft or clutch shaft 10. The third output shaft 85 can be connected directly with the power takeoff shaft 2 via a clutch 19. In the first switching range, the first output shaft 83 of the summarizing planetary transmission is connected with the clutch shaft 10 via a clutch 91, whereby the power for forward operation, when clutch 31 is closed, is transmitted to the power takeoff shaft 2 via transmission members 32, 33, 34 of the downstream planetary transmission 206; 106; 306, as in the above described transmission constructions. In the second switching range, the second output shaft 84 of the summarizing planetary transmission is connected with the clutch shaft 10 with a second clutch 92, with the power also transmitted to the power takeoff shaft 2 via the succeeding planetary transmission 206 as in the first operating range. In the third switching range, the third output shaft 85 can be coupled with the power takeoff shaft 2 via a clutch 19. For an eventual fourth switching range, the second output shaft 84 can be connected with the power takeoff shaft via a clutch 35. The transmission makes it possible to have two hydromechanical reverse ranges, with the first and second reverse range, as for forward operation, being switched via the same intermediate or clutch shaft 10. The speed reversal takes place as in the above described constructions FIGS. 3 through 7 in the downstream transmission or planetary transmission 106; 206; 306.

The transmission construction according to FIG. 10 is largely identical to the FIG. 9 construction but with the difference that the summarizing planetary transmission unit consists of two planetary transmission stages 504 and 101. The summarizing planetary transmission units 504 and 101 consist [sic!]. The summarizing planetary transmission has the same operation as the already described planetary transmission units 4, 104, 204, 304. The second summarizing planetary transmission 101 consists of a planetary transmission stage, the sun gear 102 of which is connected with the sun gear 95 of the first summarizing planetary transmission 504 and of the second hydrostat unit B. The planet carrier 14 of the second planetary transmission 101 forms the first power takeoff shaft 83, the internal gear 103 is connected with a shaft of the first four-shaft summarizing planetary transmission. The second output shaft 84 and the third output shaft 85 of the total summarizing planetary transmission unit are direct output shafts of the first summarizing planetary transmission 504.

In place of the summarizing planetary transmission units 404 or 504, 103, a further form of construction of the summarizing planetary transmission 704 according to FIG. 16 is applicable with the same function. In construction 404 the first shaft 11 is arranged over the second shaft 12. In constructions 504, 103 or 704, the second primary shaft 12 of the summarizing planetary transmission is arranged over the first shaft 11.

The five-shaft summarizing planetary transmission 404 is formed relatively simply according to the invention, with only one satellite carrier 87 on which an interlocking first set of planet gears 86 and second planet gears 87 are arranged, with the second shaft 12 engaging first planet gears 86 with its sun gear 82, the first shaft 11 also engaging first planet gears with its internal gear 81, the third shaft 83 engaging second planet gears 87 via a connected internal gear 89, the third shaft 84 also engaging second planet gears via a sun gear 90, and the fifth shaft 85 connected as common planet carrier shaft with the satellite carrier 88. (FIG. 9).

The summarizing planetary transmission 504, which forms a common five-shaft summarizing planetary transmission unit with the planetary transmission stage 101, consists of two planetary transmission stages, with the first planetary transmission stage having an interlocking first set of planet gears 99 and second set of planet gears 100. The first shaft 11 of the summarizing planetary transmission is connected with the two internal gears 93 and 94 of both planetary transmission stages. The second shaft 12 is connected with the sun gear 95 of the second planetary transmission stage, the third shaft 84 with the sun gear 98 of the first planetary transmission stage and the fifth shaft 85 forms the common planet carrier shaft 97 for both planetary transmission stages. The summarizing planetary transmission 504 has the same operation as the summarizing planetary transmissions 4, 104, 204, 304.

The five-shaft summarizing planetary transmission 704 according to FIG. 16 has two planetary transmission stages, with the second planetary transmission stage having interlocking first planet gears 86 and second planet gears 87, and the first primary shaft 11 of the summarizing planetary transmission is connected with an internal gear 144 of the first planetary transmission stage and a further internal gear 145 of the second planetary transmission stage, which gear engages a first interlocking planet gears 86. The second shaft 12 is connected with a sun gear 45 of the first planetary transmission stage, the first power takeoff shaft 83 engages second planet gears 87 with internal gear 89, the second output shaft 84 also meshes with a second set of planet gears 87 with its sun gear 90, the third output shaft 85 forms the common planet carrier shaft 88 and 143 for both planetary transmission stages.

The transmission construction according to FIG. 11 also consists of a first summarizing planetary transmission 604 and a second summarizing planetary transmission 115, with both planetary transmissions linked with each other with the first primary shaft 11 via intermediate links 36. The whole summarizing planetary transmission unit 604; 115 has at least five shafts, with the first shaft 11 connected with the first hydrostat unit A, the second shaft 12 connected with the second hydrostat unit B, the third shaft presenting a first output shaft 141, the fourth shaft a second output shaft 114, and the fifth shaft a third output shaft 113. The second output shaft 114 can be connected with a shaft 142 of the second summarizing planetary transmission 115 via a clutch 224. The second summarizing planetary transmission can be of four-shaft or five-shaft construction, with the first shaft connected with the first primary shaft 11, a second shaft 141 forming the first output shaft of the entire summarizing planetary transmission, and the third shaft 142 forming the second output shaft of the summarizing planetary transmission unit. In four-shaft construction of the second summarizing planetary transmission, a member, internal gear 118 is preferably connected with the housing via a clutch 119. In place of the planetary transmission stage 116, 121, 118 shown, a driving connection is practicable between a member of the first primary shaft 11 and a member 121 of the second summarizing planetary transmission via a countershaft and corresponding spur-gear stages. The solution is not shown in the drawings. Depending on the requirements of the division of the range sizes, various forms of construction of the first and the second summarizing planetary transmission are practicable or preferable. A further planetary transmission 206 is downstream from the summarizing planetary transmission unit 604; 115; it can be connected alternately via clutches 119, 222, 224, 223 with one of the output shafts 141, 114, 113 via an intermediate or clutch shaft 10.

Similarly to the constructions according to FIGS. 1 through 3, the transmission construction according to FIG. 12 has a four-shaft summarizing planetary transmission unit 104 to which a second, third and fourth planetary transmission unit 5, 6, 122 is attached. The second planetary transmission 5 is in three-shaft form and is connected with the second hydrostat unit B with its sun gear 29, and with the summarizing planetary transmission 104 with a link 45. The planet carrier 28 can be connected with the housing via a clutch 27. The internal gear 30 is connected with the sun gear 32 of the third planetary transmission 6, also in three-shaft form, via an intermediate shaft or clutch shaft 140.

The third planetary transmission 6 can be connected directly with the power takeoff shaft 2 with its planet carrier 33, and can be connected with the housing via a clutch 31 with its internal gear. The fourth planetary transmission 122 is connected directly with the fourth shaft 14 of the summarizing planetary transmission with its sun gear 123. The third shaft 13 of the summarizing planetary transmission can be coupled with the intermediate shaft or clutch shaft via a clutch 23 and thereby with the sun gear 32 of the third planetary transmission 6.

In the first switching range, in this transmission construction, the power is transmitted purely hydrostatically, with the power transmitted to the power takeoff shaft 2 via the third and fourth planetary transmission unit 5 and 6 when clutch 27 is closed and clutch 31 is closed. In the second switching range, clutch 23 and clutch 31 are closed. In this instance, the summarized hydraulic and mechanical power flows to the power takeoff shaft 2 via the third shaft 13 of the summarizing planetary transmission via the third planetary transmission 6. In the third switching range, the power summarized in the summarizing planetary transmission is transmitted via the fourth shaft 14 to the fourth planetary transmission 122, with clutch 126 closed. In the fourth operating range the second, third and fourth planetary transmission units 5, 6 and 122 are without load, with a direct connection produced between the third shaft 13 of the summarizing planetary transmission and the power takeoff shaft 2 when clutch 23 and 19 are closed. In the fourth operating range, the fourth shaft of the summarizing planetary transmission is connected directly with the power takeoff shaft 2 via clutch 35.

The transmission construction according to FIG. 13 is largely identical to the construction according to FIG. 12, but with the difference that the second planetary transmission 205 or 305 is constructed with a very large ratio and is connected directly with the power takeoff shaft 2 with a member, internal gear 30.

The second planetary transmission 205 has double planet gears with two individual planet gears 128 and 129 of different sizes connected with each other, which rest on the planet carrier shaft 28, and a planet gear 128 engages a sun gear 29 connected with the second hydrostat unit B, and engages the internal gear 30 connected to the power takeoff shaft 2 with its second planetary transmission 129. The third and fourth planetary transmissions 6 and 122 are in inverted position in such a way that the third planetary transmission 6 is arranged on the output side. The third and fourth shaft 13 and 14 of the summarizing planetary transmission are also in inverse order in relation to the FIG. 12 construction in such a way that the fourth shaft 14 is positioned over the third shaft 13. Operation is identical to that of the FIG. 3 construction, with the purely hydrostatic power transmitted directly to the power takeoff shaft 2 via the second planetary transmission 205 in the first operating range with clutch 27 closed. In the second switching range, the summarized hydraulic and mechanical power is transmitted to the planetary transmission 6 via the third shaft 13 of the summarizing planetary transmission with clutch 31 closed, directly to the power takeoff shaft 2. In the third, fourth, and fifth switching ranges the switching process or the switching operations are exactly identical to those of the FIG. 12 construction.

In place of the second planetary transmission 205, a further form of construction 305 according to FIG. 15 is applicable, with the second planetary transmission 305 consisting of two planetary transmission stages and the first planetary transmission stage is connected, with its sun gear 29, with the second shaft of the summarizing planetary transmission and the hydrostat unit B, the planet carrier 133 of the first planetary transmission stage connected with the sun gear 134 of the second planetary transmission stage, the internal gear 132 is or can be connected with the housing, the planet carrier 28 of the second planetary transmission stage is connected with the housing or can be connected via a clutch 27, and the internal gear 30 of the second planetary transmission stage is connected with the power takeoff shaft 2 or can be connected via a clutch. As regards operations, it does not matter which member of the planetary transmission unit 305 or 205 is used as the coupling link. It is advisable, however, to connect the planet carrier shaft 28 in construction 205, and also in construction 305 the planet carrier shaft of the second planetary transmission stage with the housing via a clutch, in order to avoid excessive speeds in unloaded condition. (FIG. 15)

The planetary transmission 306 according to FIG. 17 forms a replacement for the third planetary transmission unit 106 and 206, with only one planetary transmission stage being sufficient for switching the forward range and the reverse range. In this instance, as in constructions 106, 206, the sun gear 32 is connected with the intermediate shaft or clutch shaft 10. For switching the forward operating range, the planet carrier shaft 33 is connected with the power takeoff shaft 2 via a clutch 152 and the internal gear 34 is connected with the housing 20 via a clutch 31. When switching the reverse range, the planet carrier shaft 33 is coupled with the housing 20 via a clutch 67 and the internal gear is coupled with the power takeoff shaft 2 via a clutch 151.

The application of this planetary transmission 306 can be useful, for example, in conjunction with the application of economical, space-saving clutches of favorable shape or of favorable shape and force, such as the one known from DE 3903010, since the additional expenditure for clutch can be less than that for a second planetary transmission stage.

The summarizing planetary transmission 304 according to FIG. 14 is in four-shaft form and is identical to the constructions 104, 204 and 504. It consists of two planetary transmission stages, with the first shaft 11 connected with the planet carrier 46 of the first planetary transmission stage and with an internal gear 150 of the second planetary transmission stage, the second shaft 12 connected with a sun gear 45 of the second planetary transmission stage, the third shaft 13 connected with the planet carrier 49 of the second planetary transmission stage and the internal gear 148 of the first planetary transmission stage, and the fourth shaft 14 connected with the sun gear 147 of the first planetary transmission stage.

The summarizing planetary transmission 804 according to FIG. 16a is in five-shaft form and has two planetary transmission units, with the first planetary transmission unit having an interlocking set of first planet gears 155 and second planet gears 154, resting on a common planet carrier 153. The first primary shaft 11 is connected with the common planet carrier 153 of the first planetary transmission unit, the second primary shaft 12 is connected with the sun gear 170 engaging a first set of planet gears 155 and the internal gear 158 of the second planetary transmission unit. The first output shaft 8 of the summarizing planetary transmission is connected with the planet carrier 160 of the second planetary transmission unit, the second output shaft 84 is connected with a sun gear 159 and with the internal gear 156 of the first planetary transmission unit, which internal gear engages a first set of planet gears 155. The third output shaft 185 is connected with the internal gear 157 engaging a second set of planet gears 154.

The summarizing planetary transmission 904 according to FIG. 16b also consists of two planetary transmission units, with the second planetary transmission unit having an interlocking first set of planet gears 166 and second planet gears 167, which gears are arranged on a common planet carrier 169. The first shaft of the summarizing planetary transmission or first primary shaft 11 is connected with the internal gear 163 of the first planetary transmission stage, the second shaft 12 of the summarizing planetary transmission is connected with the sun gear 161 of the first planetary transmission stage and the internal gear 165 engaging a second set of planet gears 167. The third shaft or first output shaft 83 is attached to the common planet carrier shaft 169. The fourth shaft or second output shaft 184 is in connection with a sun gear 168 that engages a second set of planet gears 167, and the third output shaft 85 or fifth shaft of the summarizing planetary transmission is attached to the planet carrier shaft 162 of the first planetary transmission unit and to the internal gear 164 engaging a first set of planet gears 166.

The summarizing planetary transmission 804 according to FIG. 16a is in five-shaft form and has two planetary transmission units, with the first planetary transmission unit having an interlocking first set of planet gears 155 and a second set of planet gears 154, which all rest on a common planet carrier 153. The first primary shaft 11 is connected with the common planet carrier 153 of the first planetary transmission unit, the second primary shaft 12 is connected with the sun gear 170 engaging a first set of planet gears 155 and the internal gear 158 of the second planetary transmission unit. The first output shaft 83 of the summarizing planetary transmission is connected with the planet carrier 160 of the second planetary transmission unit, the second output shaft 84 is connected with a sun gear 159 and with the internal gear 156 of the first planetary transmission unit, which internal gear engages a first set of planet gears 155. The third output shaft 185 is connected with the internal gear 157 engaging a second set of planet gears 154.

The summarizing planetary transmission 904 according to FIG. 16b also consists of two planetary transmission units, with the second planetary transmission unit having an interlocking first set of planet gears 166 and a second set of planet gears 167, all arranged on a common planet carrier 169. The first shaft of the summarizing planetary transmission or first primary shaft 11 is connected with the internal gear 163 of the first planetary transmission stage, the second shaft 12 of the summarizing planetary transmission is connected with the sun gear 161 of the first planetary transmission stage and the internal gear 165 engaging a second set of planet gears 167. The third shaft or first output shaft 83 is attached to the common planet carrier shaft 169. The fourth shaft or second output shaft 184 is in connection with a sun gear 168 that engages a second set of planet gears 167, and the third output shaft 85 or fifth shaft of the summarizing planetary transmission is attached to the planet carrier shaft 162 of the first planetary transmission unit and to the internal gear 164 engaging a first set of planet gears 166.

The summarizing planetary transmission units 404, 704, 804, 904 are each in five-shaft form and operate the same as the transmission constructions according to FIGS. 9, 9a, 10 and 18. Depending on the conditions with regard to transmission design and size of the required range break-down, a focused selection of the respectively best adapted construction can be made.

The planetary transmission 306 actively connected with the clutch shaft 10 can be switched in block in one or more switching ranges, by having two planetary transmission members connected with each other, e.g. via two clutches 151 and 152. In this way it is possible to dispense with a clutch, e.g. clutch 35 and the clutch member 74 connected with the corresponding output shaft 84 of the summarizing planetary transmission. In this form of construction, in one of the switching ranges, usually the last switching range, the power is transmitted via a range clutch, e.g. clutch 92; 24; 59 to the clutch shaft 10 via the block switched planetary transmission 306 to the power takeoff shaft. The range clutch switched in the process serves in this form of construction as range clutch for two switching ranges, e.g. the switching range 2 and switching range 4 in the construction according to FIGS. 9, 9a, 10 and 18. In planetary transmission constructions 106 and 206 the clutch shaft 181 between the clutch member of the range clutches 92; 24; 59 and the clutch member 74 of clutch 35 can also be dispensed with by block switching using a clutch (not shown), by having the sun gear 32 connected with the planet carrier 33, for example. Compared to known transmission systems of this type, there is the further advantage that at every switching of range only one rotating clutch has to be switched, thus dispensing with familiar switching difficulties as a result of simultaneous multiple switching.

As a replacement for the downstream planetary transmission stage 106, 206, 306 a spur-gear transmission 406, FIG. 20 can also be used. In this instance, the intermediate shaft or clutch shaft 10 can be connected with the power takeoff shaft 2 via a first spur-gear stage 171 and a second spur-gear stage 172 connected with an intermediate gear 174. A third spur-gear stage 173 can be connected with one or more of the output shafts of the summarizing planetary transmission alternately via clutches 177, 178. The first spur-gear stage serves as power transmission in a first and second hydromechanical forward operating range and, where applicable, in a purely hydrostatic forward operating range. The second stage 172 is switched in the reverse operating range to transmit power within two hydromechanical reverse operating ranges and, where applicable, in a first purely hydromechanical range. With this transmission, as for the planetary transmission constructions 106, 206, 306, two to three reverse operating ranges are possible. Depending on the preselected driving direction, one of clutches 175; 176 is connected with one of the spur-gear stages 171 or 172 and the power takeoff shaft 2 within the first switching ranges. This transmission construction can be usefully applied in a vehicle with front and rear-wheel drive or transversely mounted engine.

The hydrostat units A and B are arranged coaxially one behind the other as a common component and combined in a compact component or in the hydrostat set 3. The first and second primary shaft 11; 12 drive into the summarizing planetary transmission from the same side. This has the advantage that a very compact and space-saving overall construction of the transmission is obtained and, furthermore, a manifold type of construction with regard to a modular design can be carried out, since the hydrostat set 2 forms can be arranged as desired in the transmission, e.g. coaxially or not aligned with the axle, as shown in FIG. 9.

By the construction and combination of the summarizing planetary transmission with the downstream or third transmission unit 106, 206, 306, 406 according to the invention, the first, second and, where applicable, third range can, in connection with the intermediate or clutch shaft 10, be operated or switched for forward driving or reverse driving depending on choice of driving direction. In this instance, for example, a transmission according to FIG. 9 with four hydromechanical forward operating ranges is provided with two hydromechanical reverse operating ranges. This transmission is optimally adapted, for example, for application in a tractor, which needs up to 50 km/h in the forward operating range and up to 25 km/h in the reverse operating range. The hydrostat set 3 and the mechanical transmission part—summarizing planetary transmission, downstream planetary transmission unit with clutches—can each be combined into small, compact components or assembly units and, if necessary, can be replaced quickly in view of a service-friendly modular design, with hydrostat set and the mechanical transmission part able to be taken out of the vehicle and replaced quickly without taking out the transmission.

OPERATIONAL DESCRIPTION

In starting condition, with a preselected driving direction of "forward:" and brake pressed down, e.g. in the FIG. 1 construction, the first range clutch 27 and clutch 31 are closed and thus the planet carrier of the first planetary transmission 5 and at the same time the internal gear 34 of the second planetary transmission 6 are connected with the housing 20. The hydrostat is set to "zero" in this instance, i.e. the second shaft 12 and all members of the first planetary transmission 5 are stationary. In this switching position, a direct driving connection is created from the hydrostat to the power takeoff shaft 2; this means that in the first operating range a purely hydrostatic power transmission takes place. To start off, the hydrostat is then adjusted in the opposite turning direction to the power takeoff shaft, causing the hydrostatic power to be transmitted to the power takeoff shaft 2 via the members of the second planetary transmission 5, the common clutch member or clutch shaft 10 and the third planetary transmission 6. The members of the summarizing planetary transmission 4 are driven via the first shaft 11 and the sun gear 45 connected with the second hydrostat unit B without load, with the third shaft 13 of the summarizing planetary transmission 4 having attained synchronism with the common clutch shaft 10 by the end of the first switching range at maximum negative normal position of the hydrostat. Switching then takes place into the second operating range while clutch 23 is closed and clutch 27 is opened. Power transmission then takes place hydromechanically via the third shaft 13 of the summarizing planetary transmission. The hydrostat is now set back to "zero" and, furthermore, up to its maximum positive normal position, which corresponds to the final point of the second switching range. At this transmission point, the driving shaft and the second hydrostat unit B have the same speed in the same turning direction, which means that all members of the summarizing planetary transmissions and all coupling elements of clutches 23 and 24 are running synchronously. Switching then takes place into the third switching range by closing of clutch 24 and opening of clutch 23. The hydrostat is then set back and runs through its full range of adjustment up to its maximum negative final position in which the third shaft 13 of the summarizing planetary transmission and the clutch member 73 connected with it have attained synchronous running with the power takeoff shaft 2. Switching into the fourth switching range then takes place while the third shaft 13 is coupled with the power takeoff shaft by closing of clutch 19, and clutch 31 is opened at the same time to take the load off internal gear 34 of the third planetary transmission 6. Clutch 24 remains closed in the process. Within this fourth switching range, the hydrostat is then adjusted once again in the opposite direction up to its maximum final position, corresponding to the final point of multiplication.

In a transmission construction as per FIG. 3, which is largely identical to construction 1, a further range is provided as fifth switching range, in such a way that the fourth shaft 14 of the summarizing planetary transmission has an additional clutch member 74 that has synchronism with the power takeoff shaft 2 by the end of the fourth switching range. To switch the fifth range, clutch 35 is then closed and clutch 19 is opened, causing a direct connection of the fourth shaft 14 of the summarizing planetary transmission with the power takeoff shaft 2. The hydrostat will then once again run through its full range of adjustment until reaching the final ratio point of the transmission.

Compared to the FIG. 1 construction, the transmission construction according to FIG. 3 has a third planetary transmission 106 with four shafts, causing an internal gear 46 of this planetary transmission to be held tight when a reverse clutch 37 closes, thus causing the turning direction of the common clutch shaft 10 to be reversed within the first three switching ranges on the power takeoff shaft 2. This transmission thus has three reverse operating ranges that can be switched identically to the first three forward operating ranges.

The transmission according to the FIG. 2 construction differs from the constructions according to FIGS. 1 and 3 in that no hydrostatic forward and reverse operating range is provided, rather the starting range, as already described, is bridged by a starting installation up to a ratio point "X". The transmission constructions according to FIGS. 4 through 7, with the exception of the first switching range, have identical operational processes as the constructions described in FIGS. 1 and 3. In this instance, the first range does not work purely hydrostatically, but also with power splitting as in all other switching ranges. Within the first switching range, the hydraulic power is transmitted to two summarizing planetary transmissions 104 and 105 or 204 and 105. When the driving direction "forward" is preselected, the first range clutch 57 closes and at the same time, clutch 31 that holds the internal gear 34 of the third planetary transmission 6. In the process, the hydrostat is set to its maximum positive position at driving speed "zero", which means that the driving shaft 1, first shaft of the summarizing planetary transmission 11 and the second shaft 12 of the summarizing planetary transmission, connected with the second hydrostat unit B, are synchronous. All members of the summarizing planetary transmission 104; 204 have block rotation in this operating mode. Within the starting procedure the hydrostat is then set back to "zero" via the control and adjusting installation and further to its maximum negative final position. Within this range of adjustment the summarized hydraulic and mechanical power is transmitted to the power takeoff shaft 2 via the planet carrier 66, the closed first range clutch 57 the third planetary transmission 6. At the end of the first switching range the third shaft 13 of the summarizing planetary transmission and the common clutch shaft 10 have attained synchronism in such a way that clutch 58 is closed and the first range clutch 57 can be opened. The further operational process is identical to the already described constructions according to FIGS. 1 and 3.

In the switching operational process for the fourth range, the transmission construction according to FIGS. 6 and 7 differs from the constructions thus far described. When switching the fourth range the power takeoff shaft 2 is coupled with the third shaft 13 of the summarizing planetary transmission in such a way that when clutch 31 is opened at the same time, clutches 60 and 58 are closed. In the process, within the switching process, the common clutch shaft 10 is to be synchronized with the two synchronously turning shafts 13 and the power takeoff shaft 2, after clutch 59 is open. This takes place for practical purposes in such a way that certain clutch intersections are steered for as is common in the known step automatic transmissions. All clutches of this type of transmission construction, with the exception of the first range clutch 57, are to be constructed as friction clutches in this instance. With regard to a seamless range switching, the following switching process is chosen in this instance: When synchronous running is achieved for the shafts 13 and the power takeoff shaft 2, first the two range clutches 58 and 60 are loaded with slight pressure and after a certain pressure is attained, both clutches 59 and 31 are opened. In this switching phase the third planetary transmission 6 that rotates without load within the fourth range is block switched at the same time.

The third planetary transmission 206 according to FIG. 8 is constructed with a first planetary transmission stage 68, 69, 72, via which the power flows to the power takeoff shaft when clutch 67 is closed and the planet carrier 68 is held tight. The reverse speed can be adapted to the forward driving speed of the concerned switched ranges by choosing corresponding ratios. In this instance, any given adaptation to the requirements specific to certain vehicles is possible that is of significance particularly for work machines such as tractors and construction vehicles. The reverse speed can be extended more widely in relation to the forward operating ranges in question by changing the internal gear and sun gear attachments around, i.e. the internal gear is not connected with the power takeoff shaft but with the common clutch shaft 10 and the sun gear is connected with the power takeoff shaft 2; the planet carrier 68 is shifted to the opposite side in the process. This construction is not shown in the illustrations.

A further form of construction of the third planetary transmission as described in patent application DE 37 09 191 under reference no. 150, can also be applied in this case.

Figure 9A:
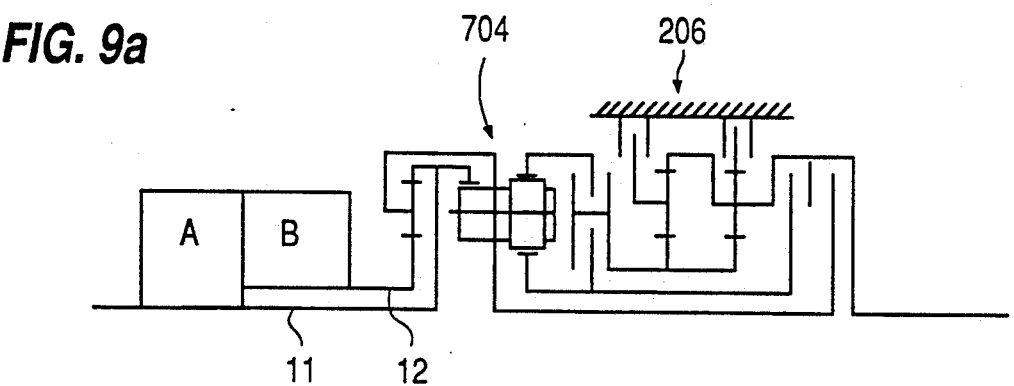

The operational process of the transmission construction according to FIG. 9, 9a and 10 differs from the constructions according to FIGS. 4 through 7 essentially by the fact that in starting condition, the first shaft 11 connected with the driving shaft and the second shaft 12 connected with the second hydrostat unit B display opposite turning directions and at the end of the first switching range and at the end of the third switching range, all members of the summarizing planetary transmission are in synchronism. The power takeoff shaft is thus at the same speed as the driving shaft or the first primary shaft 11 of the summarizing planetary transmission at the beginning of the fourth operating range. This means that the fourth range can be very advantageously utilized as overdrive rang and largely adapted to vehicle requirements with regard to optimally improving fuel consumption.

Operational process of FIG. 9, 9a and 10 transmission construction.

When preselecting the forward driving speed, the first range clutch 91 as well as clutch 31 are closed. In this way, a driving connection of the first output shaft 83 of the summarizing planetary transmission with the power takeoff shaft 2 is provided via a planetary transmission stage switched between the two. The first hydrostat unit A is set to its maximum negative size of adjustment in the process. The hydrostat is then set to "zero" and further to its maximum positive final position, causing the first output shaft 83 of the summarizing planetary transmission and the clutch shaft 10 coupled with it to have reached entrance speed.

All members of the summarizing planetary transmission and of the clutch shaft 10 are synchronous in this operation mode, so switching into the second range can take place by closing clutch 92. Clutch 91 of the first range is then opened in such a way that via the second output shaft 84 of the summarizing planetary transmission, the speed of the clutch shaft 10 can be increased even more within the second switching range, by the hydrostat adjustment being set back again to the maximum negative final position at which the third output shaft 85 has attained synchronism with the power takeoff shaft 2. Switching into the third operating range then takes place by connecting the third output shaft 85 with the power takeoff shaft 2 by closing clutch 19 and opening clutch 31 of the downstream planetary transmission 206. Clutch 92 remains closed in the process in such a way that the clutch shaft 10 has a controlled speed guide via the second output shaft 84 of the summarizing planetary transmission. When the hydrostat is repeatedly set back to its positive final position, the speed of the power takeoff shaft 2 is brought to synchronism with all members of the summarizing planetary transmission in such a way that the second output shaft 84 of the summarizing planetary transmission can be coupled with the power takeoff shaft in synchronous running condition via clutch 35, and clutch 19 can be opened. In the fourth switching range the second output shaft 84 is then directly connected with the power takeoff shaft 2 which, within the fourth switching range, then sets the power takeoff shaft at its maximum speed or the transmission at its final ratio, while the hydrostat is guided once again through its full range of adjustment to its maximum negative final position.

The switching operational process within the reverse operating range is identical to the first and second forward operating ranges, with clutch 67 being switched instead of clutch 31 of the second planetary transmission 206, causing the turning direction of the power takeoff shaft to be reversed within these two switching ranges.

The operational process of the transmission according to FIGS. 9a and 10 is identical to the FIG. 9 transmission construction.

Operational process of FIG. 11 transmission construction.

When the "forward" driving direction is preselected and the first operating range is switched at the same time, at driving speed "zero" clutch 31 of the downstream planetary transmission 206, clutch 119 as well as 223 are closed, with all members of the first summarizing planetary transmission 604 and thus the first and second primary shaft 11 and 12 being synchronous at driving speed "zero". When the hydrostat adjustment is changed from maximum positive setting to maximum negative setting, the whole first operating range is gone through, with the hydromechanical power transmitted via the first output shaft 141 to the clutch shaft 10 and via the switched planetary transmission 206 to the power akeoff shaft 2. At the end of the first switching range, the clutch shaft 10 has attained synchronism with the third output shaft 113, with clutch 222 being closed in synchronous state of the corresponding coupling links and clutch 223 being opened at the same time. By setting the hydrostat transmission back from negative final position to positive final position the second operating range is gone through, when all members of the summarizing planetary transmission 604 and the clutch shaft 10 have attained synchronism at the end of the second switching range.

Switching into the third operating range then takes place by closing of clutch 224, by means of which the third output shaft 114 transmits the summarized hydraulic and mechanical power to the clutch shaft 10 via a planetary transmission of the planetary transmission unit 206 to the power takeoff shaft. After adjusting the hydrostat through to th opposite final position, the second output shaft 113 has attained synchronism with the power takeoff shaft 2, by means of which, through closing of clutch 224, a direct connection of this shaft with the power takeoff shaft 2 is produced to switch the fourth operating range. After the range clutch 224 is opened, the hydrostat will then run through in the opposite direction where, at the end of the fourth switching range, all members of both planetary transmission units 604 and 115 have attained synchronism. Then the power takeoff shaft 2 is connected via an intermediate shaft or coupling member 138, connected by clutch 224, with the third output shaft 114 by the closing of a clutch (not shown) for the fifth operating range. [sic!] once again through its entire range of adjustment to its negative final position, to attain the final ratio of the gear at the end of the fifth operating range. For reverse operating range, three operating ranges can be switched, with the turning direction of the clutch shaft 10 within a first, second and third switching rang in the opposite turning direction to the power takeoff shaft 2 when clutch 67 is closed in the planetary transmission 206. The switching process as well as the switching operations are identical to the first, second and third forward operating range.

Operational process for FIG. 12 and 13 transmission construction.

This transmission works purely hydrostatically in the first and in the reverse range, with clutch 27 and clutch 31 being closed when driving direction is preselected. To start off, the hydrostat is then adjusted from position "zero" to it as negative final position, which corresponds to the end of the first switching range. The first output shaft 13 of the summarizing planetary transmission 104 has attained synchronism with the intermediate shaft 140 in this state, in such a way that clutch 23 can be closed to switch the second operating range and clutch 27 of the planetary transmission unit 5 can be opened. Within the second range the hydrostat is then set back to its positive final position, in which all members of the summarizing planetary transmission have attained synchronism. In this condition, the internal gear 125 of the planetary transmission 122, which is in operative connection with the second output shaft 14 of the summarizing planetary transmission, has attained speed "zero", in such a way that it can be closed via clutch 126 to switch the third operating range. The hydrostat is then set back to its negative final position, with the first output shaft 13 of the summarizing planetary transmission with the still coupled intermediate shaft or clutch shaft 140 having attained synchronism with the power takeoff shaft. To switch the fourth operating range, clutch 19 is then closed or switched to clutch 23. When the hydrostat is then successfully set back to its positive final point, synchronism of all summarizing planetary transmission members and of the power takeoff shaft 2 is again obtained at the end of the fourth switching range. Switching into the fifth range then takes place by closing of clutch 35, by means of which the power takeoff shaft is connected with the second output shaft 14 of the summarizing planetary transmission. The final ratio at the end of the fifth switching range is then attained by the hydrostat being set back to its negative final position. The intermediate shaft or clutch shaft 140 remains coupled to the first output shaft 13 via clutch 23 without load within the ranges "three" and "five".

The reverse range corresponds to the switching operation of the first forward operating range, with the hydrostat only adjusted in the corresponding opposite direction from "zero" to the positive final position. In this transmission a rapid reverse range can be switched, also purely hydrostatic, with the hydrostat transmission 6 bridged, while the internal gear 30 of the planetary transmission stage 5 is connected directly with the power takeoff shaft via clutch 19, with only the ratio of a planetary transmission stage 5 being effective when clutch 27 is closed.

The operational process of the transmission construction according to FIG. 13 is largely identical to that of FIG. 12. With clutch 27 closed, the hydrostat is adjusted through from "zero" to its negative final position, with the power takeoff shaft 2 raised via the planetary transmission 205 and its ratio to a speed at which the internal gear 34 of the planetary transmission 6 has attained speed "zero", in such a way that it can be connected via clutch 31 with the housing to switch the second range. The hydrostat is then set back to "zero" in the second switching range and further to its positive final position. In this instance all members of the summarizing planetary transmission are synchronous and the internal gear 125 is stationary by the corresponding gearing of the planetary transmission 122, in such a way that it can be coupled via clutch 126 with the housing to switch the third switching range. After repeated setting back of the hydrostat to its negative final position, the first output shaft 13 of the summarizing planetary transmission has then attained synchronism with the power takeoff shaft 2, in such a way that they can be connected with each other via clutch 19 for switching the fourth switching range. The hydrostat is now set back to its positive final position, in which all transmission members are running synchronously at the end of the fourth switching range. Then clutch 35 is closed for switching the fifth operating range. After the hydrostat is successfully set back to its maximum negative final point, the final ratio of the transmission is attained.

With this transmission a rapid reverse operating range is also possible by an additional clutch 127, via which the power takeoff shaft 2 can be directly connected with the second hydrostat unit B.

With respect to a seamless switching of ranges, synchronous running deviations or errors, e.g. as a result of load-controlled speed slip of the hydrostat, are made up for by corresponding adjustment reserves in the hydrostatics. In addition, only near synchronous running of the clutch elements to be switched is required.

The definition "synchronous running" or "synchronism" is the synchronous running range which includes the aforementioned deviations.

The definition "final position" or "maximum size of adjustment" at range change is the particular favorable normal position of the hydrostat adjustment for range switching, which can be any desired intermediate position between "zero" and the final position of the hydrostat.

For range switching, very advantageous clutches that are switchable in favorable shape and force can be used, as is known from the German patent application DE 39 03 010.

With this invention, an infinitely variable drive system is provided which, according to the type of assembly of prefabricated machine parts makes it possible to have a transmission set with which a wide scope of application in the car transmission range, truck transmission range and in the range of work machines can be covered, with few basic components - summarizing planetary transmission, second and third planetary transmission unit. For example, it is possible in a simple manner, as illustrated in FIGS. 18 and 19, to create a transmission with five forward ranges and three reverse ranges from a transmission with four forward ranges and two reverse ranges by intermediate switching of an additional planetary transmission stage 105 and a further clutch 23, in particular for the commercial vehicle range or work machine range from the basic components: summarizing planetary transmission 104, clutch sets 139, downstream planetary transmission unit 206 and a further clutch set 22, with the power takeoff speed in each last forward operating range increasing in relation to the speed of the drive shaft 1 or primary shaft 11 in a favorable way for the vehicle from the beginning of the range.

In the car range, a transmission with two or three forward operating ranges is sufficient in the lower power categories. For the higher power range, on the other hand, a third and fourth range is necessary to be able to manage with small hydrostat units also in this instance, which units must not exceed a certain size due to the high drive speeds.

This is also relevant in the range of work machines, e.g. for the tractor the top speed of which is 6 to 10 km/h. With this invention an optimal adaptation can be realized in such a way that in the main operating range, the hydraulic power shares are very low and the specific demands on the hydrostats are favorable Further advantages are that the hydrostat noises are considerably reduced by lower specific load, that the individual components are of smaller diameter than the known systems, the more quickly rotating parts lie within and the general speed level of the individual members and the relative speed are low. The individual components are easy to manufacture and can be assembled in common component sets into compact single components in an easy to assemble manner.

All transmission systems are characterized particularly in that the individual range sizes can be largely adapted to the requirements of the various conditions specific to vehicles, particularly with regard to good efficiency, and that in all ranges the last operating range can be utilized very advantageously as large overdrive range without any additional ratio adaptation stage between the transmission and the drive axle, since the power takeoff speed, as already mentioned, increases at the beginning of the last switching range to more than the drive speed. The various forms of construction of the invention permit a focussed application-related selection for nearly all vehicles, particularly in the range of higher power categories.

The individual transmission components also make it possible to have an individual adaptation to various vehicle requirements as regards design. For example, as shown in FIG. 9, the hydrostat transmission A,B is adjusted, unaligned with the axle, to the components - summarizing planetary transmission 404 and the attached planetary transmission 206 as well as the corresponding clutches. Via a drive shaft 1, 78 also unaligned with the axle, the hydrostat unit A is connected with the second shaft 12 of the summarizing planetary transmission via a spur-gear stage 77 and by a further spur-gear stage 76, and the second hydrostat unit B is connected with the second shaft 12 of the summarizing planetary transmission. The primary shaft 1 is connected with the first shaft 11 of the summarizing planetary transmission via a further spur-gear stage 75. The primary shaft 1 can be guided by the transmission and connected with a corresponding shaft 78 on the opposite side, which can serve as power takeoff in a tractor transmission. The shaft 78 can also be used as drive shaft in case drive and power takeoff are to take place on the same transmission side, which can be quite advantageous, e.g. for a motor-transmission combination with drive set arranged transversely in the vehicle. In this case there is the further possibility that the power takeoff shaft 2 can be combined with a miter gear in such a way that the transmission output shaft lying at right angle to the power takeoff shaft 2 is in a particularly favorable position in relation to the drive of the drive axle. This construction is not shown in the drawings.

A transmission construction for transverse design can be also be carried out for cars quite advantageously by, for example, having the motor arranged along the same axis as the hydrostat primary shaft 1 and the hydrostat units A and B, and the remaining components of the power splitting transmission axially added with the summarizing planetary transmission connected via two spur-gear stages with the first and second primary shaft 11 and 12, and the output shaft 2, for practical purposes, is in drive condition with an axle differential via a further spur-gear stage, as known from conventional transmissions. This construction is not shown in the drawings either.

For cars with lengthwise arranged transmission, the components, as shown in FIGS. 1 through 7 and 10 through 13, are arranged one behind the other, with a second planetary transmission 5; 105; 205 downstream from the summarizing planetary transmission and followed by a clutch set 21; 71; 790; 139 that contains two to three clutches for switching the first operating ranges and with a further planetary transmission 6; 106; 206; 306 installed after that. The clutches 19, 35 required to switch the higher switching ranges, clutches that are preferably able to be directly connected with the power takeoff shaft 2, are located for practical purposes downstream from the third or further planetary transmissions 6, 106, 206, 306 in a further clutch set 22. In this way a favorable hydraulic supply for the controlling oil of the clutches is provided.

Since ranges are switched in synchronous running or in the synchronous running range of the clutch members to be switched, clutches of favorable shape or favorable shape and force that can be very advantageously switched can be used, as known from the German patent application DE 39 03 010.

The definition "connected" or "directly connected" is a connection usually of the same speed with or without intermediately switched transmission members; e.g. by block switching of a planetary transmission, e.g. by connecting a sun gear with the internal gear or the planet carrier, as is possible by combining with the planetary transmission 306, a connection or drive connection of the same speed is produced.

In planetary transmissions, the same operation is carried out regardless of which member within the drive line is connected via a clutch. The illustrated or described clutches each show the technically more favorable solution.

I claim:

1. A hydromechanical transmission having a power input shaft, a power output shaft and a multiple path power transmission apparatus for transmitting power from said power input shaft to said power output shaft in at least three hydrostatic mechanical forward shift ranges, said power transmission apparatus comprising:
   a hydrostatic drive device drivingly connected to said power input shaft, said hydrostatic drive device comprising a variable speed drive unit and a driven unit having a first hydrostatic power take off shaft;
   a summation planetary transmission mechanism comprising a first shaft that is in constant driving connection with said power input shaft, a second shaft that is in constant driving connection with said hydrostatic power take off shaft, the third, fourth and fifth shafts that are all power delivery shafts which can be connected, either directly or indirectly, with said power output shaft; and
   a planetary transmission arrangement having an inlet shaft,
   said third shaft being connectable with said inlet shaft via a first clutch in a first shift range of the transmission,
   said fourth shaft being connectable with said inlet shaft via a second clutch in a second shift range of the transmission,
   said planetary transmission arrangement having a power outlet shaft that can be connected to said power output shaft by means of a closed third clutch or a brake so that the power summed up in the summation planetary transmission mechanism may be transmitted via the planetary transmission arrangement to the power output shaft in said first and second shift ranges of the transmission when said third clutch is closed,
   said fifth shaft being connectable with said power output shaft via a fourth clutch, which preferably is connected to the planetary transmission arrangement, in a third shift range of the transmission,
   said fourth shaft being directly or indirectly connectable with said power output shaft in a fourth shift range of the transmission.

2. A hydromechanical transmission as set forth in claim 1, wherein said second planetary transmission mechanism includes a sixth clutch for reversing the direction of rotation of the power outlet shaft of the second transmission mechanism when said sixth clutch is actuated, to provide integrated reverse operational capabilities via said first and second clutches in said first and second shift ranges.

3. A hydromechanical transmission as set forth in claim 1, wherein said second planetary transmission mechanism comprises two planetary transmission stages, each of said stages including a sun gear, a planet carrier and an internal gear, the sun gears of said stages being interconnected by a common coupling link, the planet carrier of the first stage being connectable with a transmission housing via a clutch for a reverse shift range, the internal gear of the first stage being in constant driving connection with the planet carrier of the second stage and with the power output shaft, and internal gear of the second stage being connectable via a brake or clutch element with said housing.

4. A hydromechanical transmission as set forth in claim 1, wherein said hydrostatic drive device is parallel to the axis of rotation of the power input shaft, and wherein said transmission includes ratio stages for connecting the device to the power input shaft and to said second shaft, said ratio stages being positioned in front of or behind the planetary transmission arrangement.

5. A hydromechanical transmission are set forth in claim 1, wherein said first and second clutches are joined together to present a first set of clutches which is positioned between the summation planetary transmission mechanism and the planetary transmission arrangement, and said third and fourth clutches are joined together to present a second set of clutches.

6. A hydromechanical transmission as set forth in claim 1, wherein said third and fourth clutches are located downstream from said planetary transmission arrangement and pressure oil is preferably transferred via a common coupling link connected with the power output shaft.

7. A hydromechanical transmission having a power input shaft, a power output shaft and a multiple path power transmission apparatus for transmitting power from said power input shaft to said power output shaft in at least three hydrostatic mechanical forward shift ranges, said power transmission apparatus comprising:
   a hydrostatic drive device drivingly connected to said power input shaft, said hydrostatic drive device comprising a variable speed drive unit and a driven unit having a first hydrostatic power take off shaft;
   a summation planetary transmission mechanism comprising a first shaft that is in constant driving connection with said power input shaft, a second shaft that is in constant driving connection with said power take off shaft, and third, fourth and fifth shafts that are all delivery shafts which can be connected, either directly or indirectly, with said power output shaft; and
   a planetary transmission arrangement having an inlet shaft,
   said third and fourth shafts being alternately connectable with said inlet shaft in first and second shift ranges of the transmission,
   said fifth shaft being directly or indirectly connectable with said power output shaft in a third shift range of the transmission,
   said summation planetary transmission mechanism including first and second sets of interlocking planet gears, said first shaft comprising a first internal gear which is in engagement with said first set of planet gears, said second shaft comprising a first sun gear which is in engagement with said first set of planet gears, said third shaft comprising a second internal gear which is in engagement with said second set of planet gears, said fourth shaft comprising a second sun gear which is in engagement with said second set of planet gears, and said fifth shaft comprising a common planetary carrier for said first and second sets of planet gears.

8. A hydromechanical transmission as set forth in claim 7, wherein said second planetary transmission mechanism comprises two planetary transmission stages, each of said stages including a sun gear, a planet carrier and an internal gear, the sun gears of said stages being interconnected by a common coupling link, the planet carrier of the first stage being connectable with a transmission housing via a clutch for a reverse shift range, the internal gear of the first stage being in constant driving connection with the planet carrier of the second stage and with the power output shaft, and the internal gear of the second stage being connectable via a brake or clutch element with said housing.

9. A hydromechanical transmission as set forth in claim 7, wherein said hydrostatic drive device is parallel to the axis of rotation of the power input shaft, and wherein said transmission includes ratio stages for connecting the device to the power input shaft and to said second shaft.

10. A hydromechanical gear with a drive shaft, an output shaft, and a branching gear device for transferring power from said drive shaft to said output shaft in at least three hydrostatic mechanical forward shifting ranges, said branching gear device comprising:
   a hydrostatic drive unit connected on the drive side to the said drive shaft, said hydrostatic drive unit including a hydro compact drive and a drive end with a first hydrostatic output shaft;
   a summation planetary gear mechanism having a first shaft which is connected to said drive shaft in continual drive, a second shaft which is connected to said hydrostatic output shaft in continual drive, and third, fourth, and fifth shafts which are all outgoing shafts, and which can be connected either directly or indirectly to said output shaft; and
   a planetary gear arrangement with an incoming shaft,
   said third and fourth shafts being alternately connectable with the incoming shaft in first and second control gear ranges,
   said fifth shaft being connectable either directly or indirectly with the output shaft in a third control gear range,
   the clutches for the first and second control gear ranges being positioned between the summary planetary gear mechanism and the planetary gear arrangement, and the clutch for the third control gear range being positioned on the output side behind the planetary gear arrangement.

11. A hydromechanical transmission as set forth in claim 1, 7, 2, 3, 8, 4, 5, 6, 9, 10, wherein the summation planetary transmission mechanism includes a single planet carrier for all of the planet gears of the mechanism.

12. A hydromechanical transmission as set forth in claim 1, 7, 2, 3, 8, 4, 5, 6, 9, 10, wherein the summation planetary transmission mechanism includes at least one planet carrier and said fifth shaft comprises the supporting shaft for all of the planet carriers of the mechanism.

13. A hydromechanical transmission as set forth in claim 1, 7, 2, 3, 8, 4, 5, 6, 9, 10, or wherein is included one or more planet carriers, wherein said fifth shaft is an internal shaft operable for shifting said third shift range, and wherein at least one of the third and forth shafts is positioned above the fifth shaft.

14. A hydromechanical transmission having a power input shaft, a power output shaft and a multiple path power transmission apparatus for transmitting power from said power input shaft to said power output shaft in at least three hydrostatic mechanical forward shift ranges and at least one hydrostatic mechanical reverse shift range, said power transmission apparatus comprising:
   a hydrostatic drive device drivingly connected to said power input shaft, said hydrostatic drive device comprising a variable speed drive unit and a driven unit having a first hydrostatic power take off shaft;
   a summation planetary transmission mechanism comprising a first shaft that is in constant driving connection with said power input shaft, a second shaft that is in constant driving connection with said hydrostatic power take off shaft, and third, fourth and fifth shafts that are all power delivery shafts which can be connected, either directly or indirectly, with said power output shaft; and
   a planetary transmission arrangement having an inlet shaft, said third shaft being connectable with said inlet shaft via a first clutch in a first shift range of the transmission, said fourth shaft being connectable with said inlet shaft via a second clutch in a second shift range of the transmission, said planetary transmission arrangement having a power outlet shaft that can be connected to said power output shaft by a closed third clutch or a brake so that the power summed up in the summation planetary transmission mechanism may be transmitted via the planetary transmission arrangement to the power output shaft in said first and second shift ranges of the transmission when said third clutch is closed, said fifth shaft being connectable with said power output shaft via a fourth clutch, which preferably is connected to the planetary transmission arrangement, in a third shift range of the transmission, said fourth shaft being directly or indirectly connectable with said power output shaft in a fourth shift range of the transmission, said planetary transmission arrangement including a reverse drive device having a reversing shaft which can be connected to the housing by a reversing clutch or brake.

15. A transmission as set forth in claim 14, wherein said reversing shaft comprises a planet carrier.

16. A transmission as set forth in claim 14, wherein said reversing shaft comprises an internal gear.

17. A hydromechanical transmission as set forth in claim 14, wherein said hydrostatic drive device is parallel to the axis of rotation of the power input shaft, and wherein said transmission includes ratio stages for connecting the device to the power input shaft and to said second shaft, said ratio stages being positioned in front of or behind the planetary transmission arrangement.

18. A hydromechanical transmission as set forth in claim 14, wherein said first and second clutches are joined together to present a first set of clutches which is positioned between the summation planetary transmission mechanism and the planetary transmission arrangement, and said third and fourth clutches are joined together to present a second set of clutches.

19. A hydromechanical transmission as set forth in claim 14, wherein said third and fourth clutches are located downstream from said planetary transmission arrangement and pressure oil is preferably transferred via a common coupling link connected with the power output shaft.

* * * * *